United States Patent
Tada et al.

(10) Patent No.: US 8,974,556 B2
(45) Date of Patent: Mar. 10, 2015

(54) HYDROGEN GENERATOR

(75) Inventors: Kouji Tada, Osaka (JP); Masaki Nobuoka, Nara (JP); Kazuya Shima, Shiga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 339 days.

(21) Appl. No.: 13/637,491

(22) PCT Filed: May 20, 2011

(86) PCT No.: PCT/JP2011/002819
§ 371 (c)(1),
(2), (4) Date: Sep. 26, 2012

(87) PCT Pub. No.: WO2011/151986
PCT Pub. Date: Dec. 8, 2011

(65) Prior Publication Data
US 2013/0064723 A1   Mar. 14, 2013

(30) Foreign Application Priority Data
Jun. 2, 2010  (JP) .................. 2010-126982

(51) Int. Cl.
  *C01B 3/00*   (2006.01)
  *C01B 3/32*   (2006.01)
  (Continued)

(52) U.S. Cl.
  CPC *B01J 7/00* (2013.01); *B01J 8/0469* (2013.01); *B01J 8/0492* (2013.01); *B01J 8/0496* (2013.01); B01J 2208/00504 (2013.01);
  (Continued)

(58) Field of Classification Search
  USPC ............................. 48/61; 422/625
  See application file for complete search history.

(56) References Cited

U.S. PATENT DOCUMENTS 3,339,631 A * 9/1967 McGurty et al. ............ 165/109.1
4,093,479 A * 6/1978 Baird .............................. 159/6.2
(Continued)

FOREIGN PATENT DOCUMENTS

EP  0 095 748 A2  12/1983
EP  2 161 061 A1   3/2010
(Continued)

OTHER PUBLICATIONS

Extended European Search Report for Application 11789401.4-1361 / 2543628 dated Apr. 3, 2013.
(Continued)

*Primary Examiner* — Matthew Merkling
(74) *Attorney, Agent, or Firm* — Pearne & Gordon LLP

(57) ABSTRACT

Disclosed is a hydrogen generator that prevents the reformate water from bypassing the evaporator in a hydrogen generator, and the occurrence of sudden temperature changes within an evaporation flow path. The hydrogen generator comprises: an evaporator that produces a mixed gas by mixing a raw material gas containing methane with water vapor; a reformer that changes the mixed gas into a hydrogen-containing gas through a steam reforming reaction; and a combustor that supplies heat to the evaporator and the reformer. The evaporator comprises: an inner cylinder; an outer cylinder enclosing the inner cylinder; and a middle cylinder that is inserted between the inner cylinder and the outer cylinder, and that defines a helical flow path between the inner cylinder and the outer cylinder, through which water supplied from the outside flows.

11 Claims, 10 Drawing Sheets

(51) Int. Cl.
*B01J 7/00* (2006.01)
*B01J 8/04* (2006.01)
*C01B 3/38* (2006.01)
*C01B 3/48* (2006.01)
*H01M 8/06* (2006.01)
*H01M 8/04* (2006.01)

(52) U.S. Cl.
CPC .................. *B01J 2208/0053* (2013.01); *B01J 2208/00929* (2013.01); *B01J 2208/00938* (2013.01); *B01J 2208/025* (2013.01); *C01B 3/384* (2013.01); *C01B 3/48* (2013.01); *C01B 2203/0233* (2013.01); *C01B 2203/0283* (2013.01); *C01B 2203/044* (2013.01); *C01B 2203/047* (2013.01); *C01B 2203/066* (2013.01); *C01B 2203/0811* (2013.01); *C01B 2203/1047* (2013.01); *C01B 2203/1052* (2013.01); *C01B 2203/1235* (2013.01); *C01B 2203/1241* (2013.01); *C01B 2203/1614* (2013.01); *H01M 8/0631* (2013.01); *H01M 8/0668* (2013.01); *H01M 8/04022* (2013.01); *H01M 8/04201* (2013.01); *Y02E 60/50* (2013.01); *C01B 2203/1294* (2013.01); *C01B 2203/82* (2013.01)

USPC .............................................. 48/61; 422/625

(56) References Cited

U.S. PATENT DOCUMENTS

| | | | | |
|---|---|---|---|---|
| 4,318,773 A | * | 3/1982 | Ullrich et al. | 159/47.1 |
| 4,790,371 A | * | 12/1988 | Zundel | 165/163 |
| 6,863,117 B2 | * | 3/2005 | Valenzuela | 165/104.26 |
| 2004/0172877 A1 | | 9/2004 | Wunning | |

FOREIGN PATENT DOCUMENTS

| | | |
|---|---|---|
| JP | 08-192040 A | 7/1996 |
| JP | 2002-211905 A | 7/2002 |
| JP | 2003-327407 A | 11/2003 |
| JP | 2004-014141 A | 1/2004 |
| JP | 2008-063193 A | 3/2008 |

OTHER PUBLICATIONS

International Search Report for PCT/JP2011/002819 dated Aug. 30, 2011.

* cited by examiner

FIG. 3A
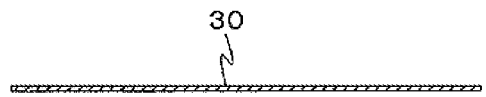
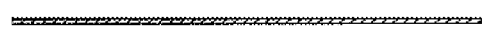
FIG. 3B
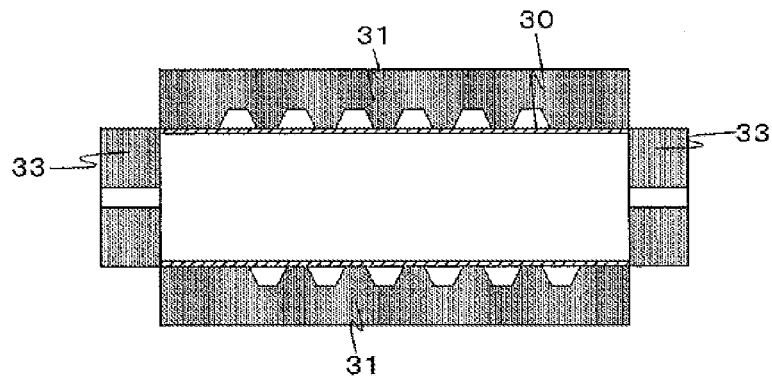
FIG. 3C
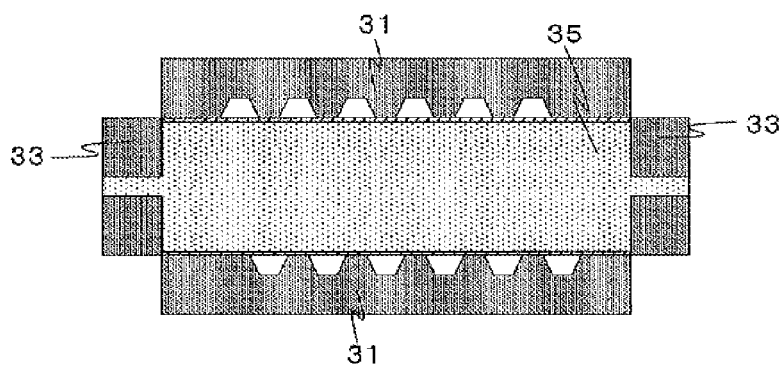
FIG. 3D
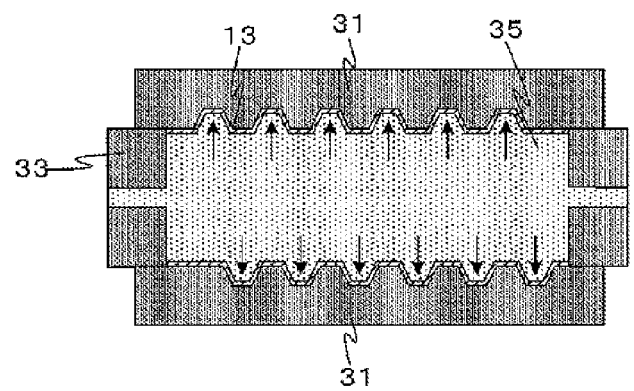

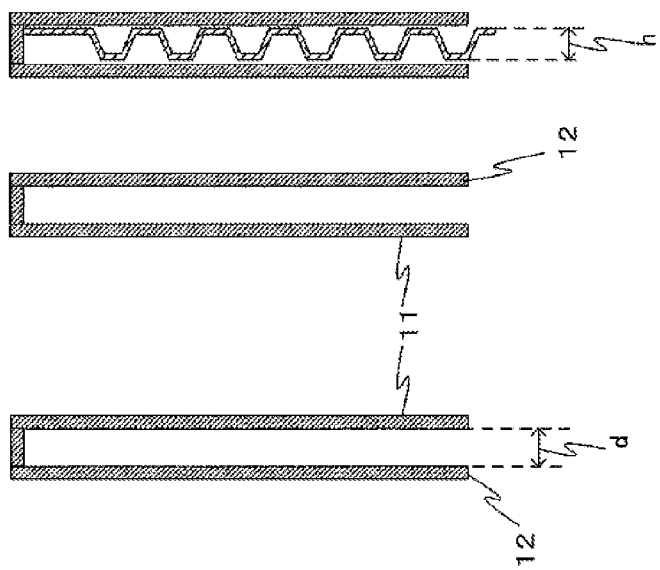

HYDROGEN GENERATOR

TECHNICAL FIELD

The present invention relates to a hydrogen generating apparatus for generating hydrogen to be supplied to a fuel cell system, and more specifically, relates to an evaporator of a hydrogen generating apparatus.

BACKGROUND ART

Fuel cell systems such as residential cogeneration systems include a hydrogen generating apparatus configured to generate a hydrogen-containing fuel gas, and fuel cells configured to generate power by utilizing the fuel gas generated by the hydrogen generating apparatus.

A hydrogen generating apparatus for a fuel cell system includes: an evaporator for mixing a source gas such as hydrocarbon-based fuel (e.g., town gas, LPG) with water vapor; a reformer for allowing steam-reforming reaction of the mixture gas to occur at a high temperature of around 600° C. to 800° C. to generate a hydrogen-containing gas containing hydrogen as primary component; a shift converter for reducing the level of carbon monoxide, a substance which is poisonous to catalyst used in the fuel cells, to around 0.5% by the CO shift reaction; and a CO remover for further reducing the carbon monoxide level to around 10 ppm by a selective oxidation reaction (see, e.g., Patent Literature 1).

A cross-section of a hydrogen generating apparatus that has already been proposed (see Patent Literature 1) is illustrated in FIG. 10. Hydrogen generating apparatus 1 illustrated in FIG. 10 includes evaporator 10, reformer 2, shift converter 3, CO remover 4, and combustor 6.

Evaporator 10 includes inner cylinder 11, outer cylinder 12, and spiral evaporation channel 18 defined by a spiral coil of round rod (channel defining member) 50 provided between inner cylinder 11 and outer cylinder 12. Further, inner cylinder 11 and outer cylinder 12 can each be fabricated by, for example, vertically welding a rolled stainless steel plate.

Such evaporator 10 is fabricated by, for example, inserting inner cylinder 11 into outer cylinder 12 in which a spiral coil of round rod 50 is welded to the inner circumference surface thereof, and expanding inserted inner cylinder 11. By expanding inner cylinder 11 inserted into outer cylinder 12, the outer circumference surface of inner cylinder 11 and round rod 50 come into contact with each other and thereby spiral evaporation channel 18 is formed between inner cylinder 11 and outer cylinder 12.

To spiral evaporation channel 18 of evaporator 10 having such a configuration are supplied a source gas and water to be reformed. The source gas is supplied from source feeder 15; and the water is supplied from water feeder 16. The water supplied to evaporation channel 18 is evaporated by being heated by combustion gas flowing through combustion gas channel 14. As a result, in evaporator 10, a mixture gas of the source gas and water vapor is produced.

Further, by providing evaporation channel 18 in the form of spiral, it is possible to increase the length of evaporation channel 18, thereby making it possible to increase the amount of heat supplied to water to be reformed 17 while water passes through evaporation channel 18. As a result, it is possible to facilitate evaporation of water to be reformed 17. This makes it possible to increase the amount of water vapor used for steam reforming reaction in the reformer.

Further, a method is proposed in which the evaporation channel is defined by, instead of the rod wound in spiral form, a protrusion formed on the inner circumference surface of the outer cylinder or the outer circumference surface of the inner cylinder (see Patent Literature 1 or 2).

Further, a technique is known that uses a metal tube that is spirally wound around the outer circumference surface of the inner cylinder as a evaporation channel (see, for example, patent literature 3). In the hydrogen generating apparatus disclosed by Patent Literature 3, a source gas and water to be reformed flow in a metal tube that is wound around the outer circumference surface of the inner cylinder in the form of spiral.

CITATION LIST

Patent Literature

PTL1 Japanese Patent Application Laid-open No. 2008-63193
PTL2 Japanese Patent Application Laid-open No. 2002-211905
PTL3 Japanese Patent Application Laid-open No. 2004-14141

SUMMARY OF INVENTION

Technical Problem

In hydrogen generating apparatus 1 such as that illustrated in FIG. 10, in order to stabilize the steam reforming reaction in reformer 2 to generate a stabilized amount of hydrogen-containing gas, it is requested to keep the flow rate and temperature of the water vapor formed in evaporator 10 within desired ranges. In order to stabilize the flow rate and the temperature of the water vapor, it is requested to heat the water to be reformed at a constant rate in evaporator 10, and to evaporate it at a constant rate.

On the other hand, evaporator 10 fabricated by expanding inner cylinder 11 inserted into outer cylinder 12 suffers from a drawback that the contact state of round rod 50 and inner cylinder 11 and outer cylinder 12 becomes unstable, and therefore sealing of evaporation channel 18 becomes unstable. For example, where beads formed by vertical, welding (raised parts due to welding) are placed on the side of the outer circumference surface of inner cylinder 11 or on the inner circumference surface of outer cylinder 12, or where inner cylinder 11 or outer cylinder 12 is not completely round, a gap is formed between round rod 50 and inner cylinder 11 and outer cylinder 12, and therefore sealing of evaporation channel 18 becomes insufficient.

When gaps are formed between round rod 50 and inner cylinder 11 and outer cylinder 12, part of the water to be reformed, which otherwise should spirally flow along spiral evaporation channel 18, undesirably bypasses sections of spiral evaporation channel 18 via the gaps. In this way, when part of the water to be reformed bypasses sections of evaporation channel 18, the position at which the water to be reformed is evaporated becomes unstable, and therefore the flow rate of the water vapor produced in the evaporator and the temperature fluctuate.

Further, since round rod 50 makes a line contact with inner cylinder 11 and outer cylinder 12, when a contact state between round rod 50 and inner cylinder 11 and outer cylinder 12 becomes unstable, the amount of heat conducting to round rod 50 from the combustion gas passing on the inner circumference surface of inner cylinder 11 and the amount of heat conducting from round rod 50 to outer cylinder 12 locally fluctuate, causing a sudden temperature change within evaporation channel 18. When the temperature suddenly changes within evaporation channel 18, the water to be reformed may not be evaporated at a position where evaporation should take place, or the bumping of the water to be reformed occurs, resulting in fluctuation in the flow rate and the temperature of the water vapor produced in the evaporator.

The problem fluctuation of the flow rate and temperature of the water vapor formed in evaporator 10 can be overcome by increasing the length of evaporation channel 18. However, when evaporation channel 18 is elongated, evaporator 10 is also elongated, and as a result, hydrogen generating apparatus 1 becomes large.

Furthermore, since it is difficult to machine round rod 50 into a desired spiral shape, it has been difficult to define evaporation channel 18 of a desired spiral, shape by round rod 50.

The present invention was made in view of the foregoing problems, and an object of the present invention is to provide a hydrogen generating apparatus having an evaporator that can control bypassing of water to be reformed and a sudden temperature change within the evaporation channel.

Solution to Problem

The inventors found that it is possible to prevent bypassing of the water to be reformed and sudden temperature change within the evaporation channel by defining a spiral evaporation channel by a cylinder having elasticity and extensibility, and further implemented the review to complete the present invention.

In other words, the present invention relates to hydrogen generating apparatus given below.

[1] A hydrogen generating apparatus comprising:
an evaporator configured to generate a mixture gas by mixing a source gas containing methane with water vapor;
a reformer configured to convert the mixture gas to hydrogen-containing gas by a steam reforming reaction; and
a combustor configured to supply heat to the evaporator and the reformer, wherein the evaporator comprises an inner cylinder, an outer cylinder surrounding the inner cylinder, and a center cylinder inserted between the inner cylinder and the outer cylinder, the center cylinder defining, between the inner cylinder and the outer cylinder, a spiral channel configured to allow water supplied from outside to flow,
a spiral protrusion and a spiral recess, the spiral protrusion and the spiral recess formed on an inner circumference surface and an outer circumference surface of the center cylinder in such a unitary manner that one of the spiral protrusion and the spiral recess serves as the other on one of inner circumference surface and outer circumference surface of the center cylinder and vice versa, and
a top surface of the protrusion on the inner circumference surface of the center cylinder comes in contact with an outer circumference surface of the inner cylinder, and a top surface of the protrusion on the outer circumference surface of the center cylinder comes in contact with an inner circumference surface of the outer cylinder.

[2] The hydrogen generating apparatus according to [1], wherein a thickness of a plate constituting the center cylinder is 0.2 to 0.6 mm.

[3] The hydrogen generating apparatus according to [1] or [2], wherein the center cylinder is not welded to the inner cylinder and the outer cylinder.

[4] The hydrogen generating apparatus according to any one of [1] to [3], wherein an area of the top surface of the protrusion on the inner circumference surface of the center cylinder that comes in contact with the outer circumference surface of the inner cylinder is different from an area of the top surface of the protrusion on the outer circumference surface of the center cylinder that comes in contact with the inner circumference surface of the outer cylinder.

[5] The hydrogen generating apparatus according to any one of [1] to [4], wherein a pitch of the spiral channel in the upstream side, and a pitch of the spiral channel in the downstream side are different from each other.

[6] The hydrogen generating apparatus according to any one of [1] to [5], wherein the spiral channel configured to allow the water to flow is formed of the recess on the outer circumference surface of the center cylinder.

[7] The hydrogen generating apparatus according to [6], wherein the recess on the outer circumference surface of the center cylinder has a region in an upper side in a direction of the gravitational force, and a region in a lower side in a direction of the gravitational force, the region in the lower side in the direction of the gravitational force is shallower than the region in the upper side in the direction of the gravitational force, and the water flows between the region in the lower side in the direction of the gravitational force and the inner circumference surface of the outer cylinder.

[8] The hydrogen generating apparatus according to any one of [1] to [5], wherein the spiral channel configured to allow the water to flow is formed of the recess on the inner circumference surface of the center cylinder.

[9] The hydrogen generating apparatus according to [8], wherein the recess on the inner circumference surface of the center cylinder has a region in an upper side in a direction of the gravitational force, and a region in a lower side in a direction of the gravitational force, the region in the lower side in the direction of the gravitational force is shallower than the region in the upper side in the direction of the gravitational force, and the water flows between the region in the lower side in the direction of the gravitational force and the outer circumference surface of the inner cylinder.

[10] The hydrogen generating apparatus according to any one of [1] to [9], wherein the spiral channel configured to allow the water to flow comprises a projection that serves as a barrier for controlling the flow of the water.

Advantageous Effects of Invention

In the evaporator in the hydrogen generating apparatus of the present invention, bypassing of water to be reformed does not occur, and therefore the temperature within the evaporation channel is stabilized. Therefore, in the evaporator of the hydrogen generating apparatus of the present invention, it is possible to heat the water to be reformed at a constant rate and evaporate it at a constant rate, and therefore, it is possible to stabilize the flow rate and the temperature of the water vapor to be produced without having to increase the size of the evaporator. As a result, the hydrogen generating apparatus of the present invention can stably supply hydrogen.

BRIEF DESCRIPTION OF DRAWINGS

FIGS. 3A, 3B, 3C and 3D are diagrams showing a method for fabricating the center cylinder in Embodiment 1;

FIGS. 4A, 4B, 4C and 4D are diagrams showing a method for fabricating an evaporator in Embodiment 1;

DESCRIPTION OF EMBODIMENTS

The hydrogen generating apparatus of the present invention has an evaporator, a reformer, a shift converter, a CO remover and a combustor. The hydrogen generating apparatus of the present invention, by a devised structure of a member defining the evaporation channel of the evaporator, can: 1) prevent the water to be reformed from bypassing sections of the evaporation channel, and 2) prevent sudden change of the temperature in the evaporation channel.

To the evaporator, water (water to be reformed) and a methane-containing source gas such as a hydrocarbon-based fuel such as town gas or LPG are supplied from the outside. The evaporator has a spiral channel in which the water to be reformed supplied from the outside flows (hereafter also referred to as "evaporation channel"). The water to be reformed supplied from the outside is heated, evaporated, and turns into water vapor while flowing through the evaporation channel. As a result, the water vapor and the source gas are mixed in the evaporator and a mixture gas is produced. The detailed structure of the evaporator will be described later.

The reformer is connected to the evaporator and generates, from the mixture gas produced in the evaporator, hydrogen-containing gas having hydrogen as a primary component by the steam reforming reaction. The hydrogen-containing gas generated in the reformer contains a certain level of carbon monoxide. The reformer includes a metal-based reforming catalyst including Ni-based catalytic substance and Ru-based catalytic substance.

The shift converter connects to the reformer and decreases the carbon monoxide concentration in the hydrogen-containing gas formed in the reformer to around 0.5% by the CO shift reaction (water gas shift reaction).

The CO remover is connected to the shift converter and further removes by oxidation reaction carbon monoxide from the hydrogen-containing gas containing a low level of carbon monoxide, which gas has been generated in the shift converter.

The combustor supplies heat to the evaporator and the reformer. The combustor is composed of a burner or the like.

As stated above, the hydrogen generating apparatus of the present invention has a feature in the structure of the evaporator. Hereafter, the structure of the evaporator will be explained in detail.

Figure 1:
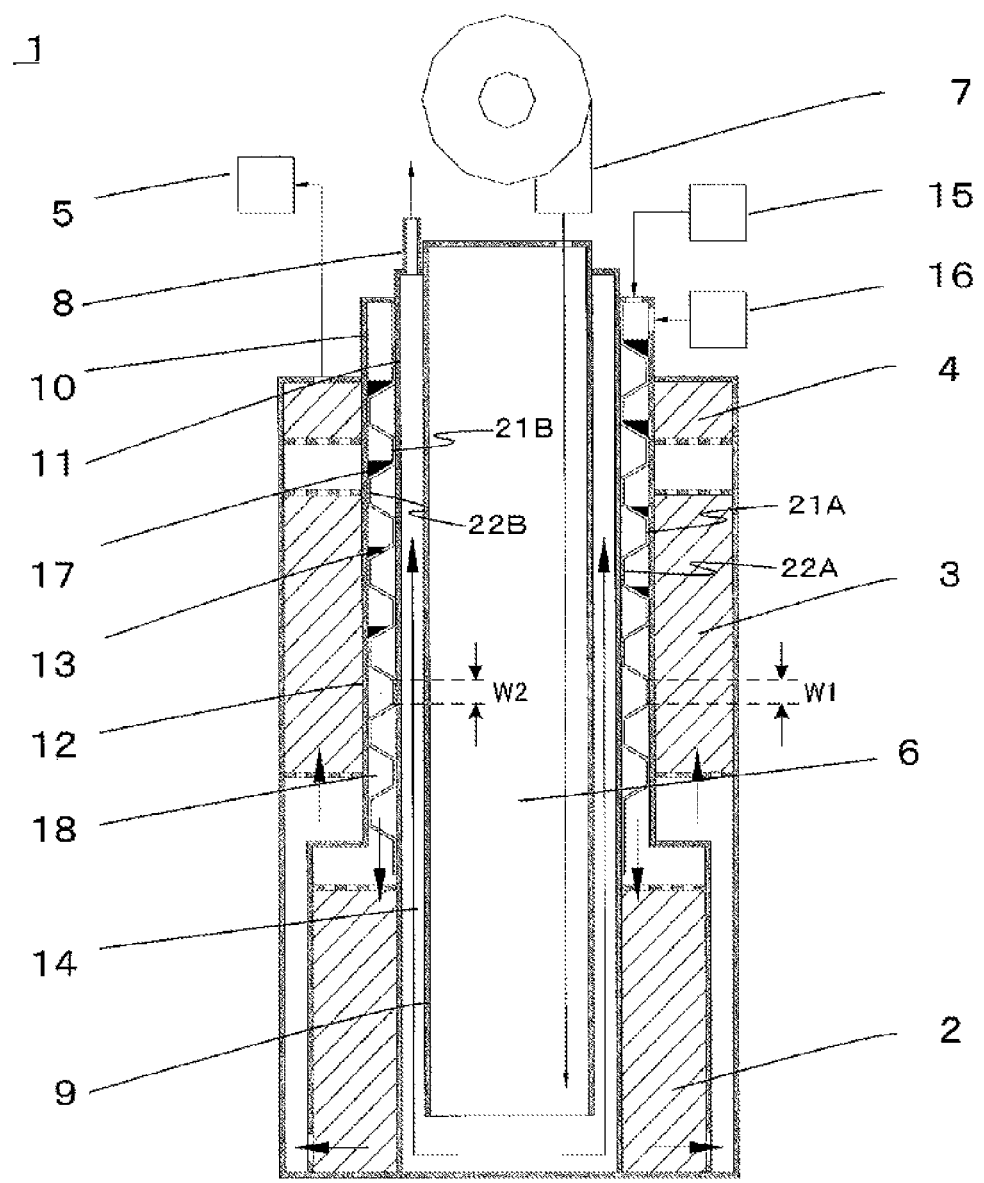
FIG. 1 is a schematic diagram of a cross-section of a hydrogen generating apparatus according to Embodiment 1 of the present invention.

The evaporator has an inner cylinder, an outer cylinder that surrounds the inner cylinder, and a center cylinder inserted between the inner cylinder and the outer cylinder (see FIG. 1). Inside the inner cylinder, a combustor is disposed. Further, on the inner circumference surface of the inner cylinder, a combustion gas channel configured to allow combustion gas heated by the combustor to flow may be formed (see FIG. 1).

The outer diameter of the inner cylinder is, for example, 60 to 100 mm; and the inner diameter of the outer cylinder is, for example, 61 to 101 mm. Further, the gap between the outer cylinder and the inner cylinder is, for example, 1 to 5 mm. It is preferable that the inner cylinder and the outer cylinder are concentric with each other.

The inner cylinder and the outer cylinder are each fabricated by, although not limited in particular, vertically welding, for example, a rolled metal plate. The thickness of the metal plate constituting the inner cylinder and outer cylinder is 0.8 to 1.5 mm. The material of the metal, plate is, for example, austenitic stainless steel such as, SUS310.

The center cylinder is a member for defining a spiral evaporation channel in the space between the inner cylinder and the outer cylinder. It is preferable that the center cylinder is concentric with the inner cylinder and the outer cylinder. In this way, the present invention defines the spiral evaporation channel by a cylinder (center cylinder) inserted between the inner cylinder and the outer cylinder.

On the inner circumference surface and the outer circumference surface of the center cylinder, a spiral protrusion and a spiral recess are formed in such a unitary manner that one of the spiral protrusion and the spiral recess serves as the other on one of inner circumference surface and outer circumference surface of the center cylinder, and vice versa, to define a spiral evaporation channel. In other words, the protrusion on the outer circumference surface of the center cylinder corresponds to the recess on the inner circumference surface of the center cylinder, and the recess on the outer circumference surface of the center cylinder corresponds to the protrusion on the inner circumference surface of the center cylinder (see FIG. 1).

The protrusion formed on the inner circumference surface and the outer circumference surface of the center cylinder has a top surface and the recess has a bottom surface. It is preferable that the protrusion has forward-tapered shape. The top surface of the protrusion on the outer circumference surface of the center cylinder comes in contact with the inner circumference surface of the outer cylinder, and the top surface of the protrusion on the inner circumference surface of the center cylinder comes in contact with the outer circumference surface of the inner cylinder. In this way, in the present invention, the center cylinder makes a surface contact with the inner cylinder and outer cylinder. When the center cylinder makes a surface contact with the inner cylinder, it is possible to stabilize the amount of heat received by the center cylinder via, the inner cylinder from the combustor.

Figure 5:
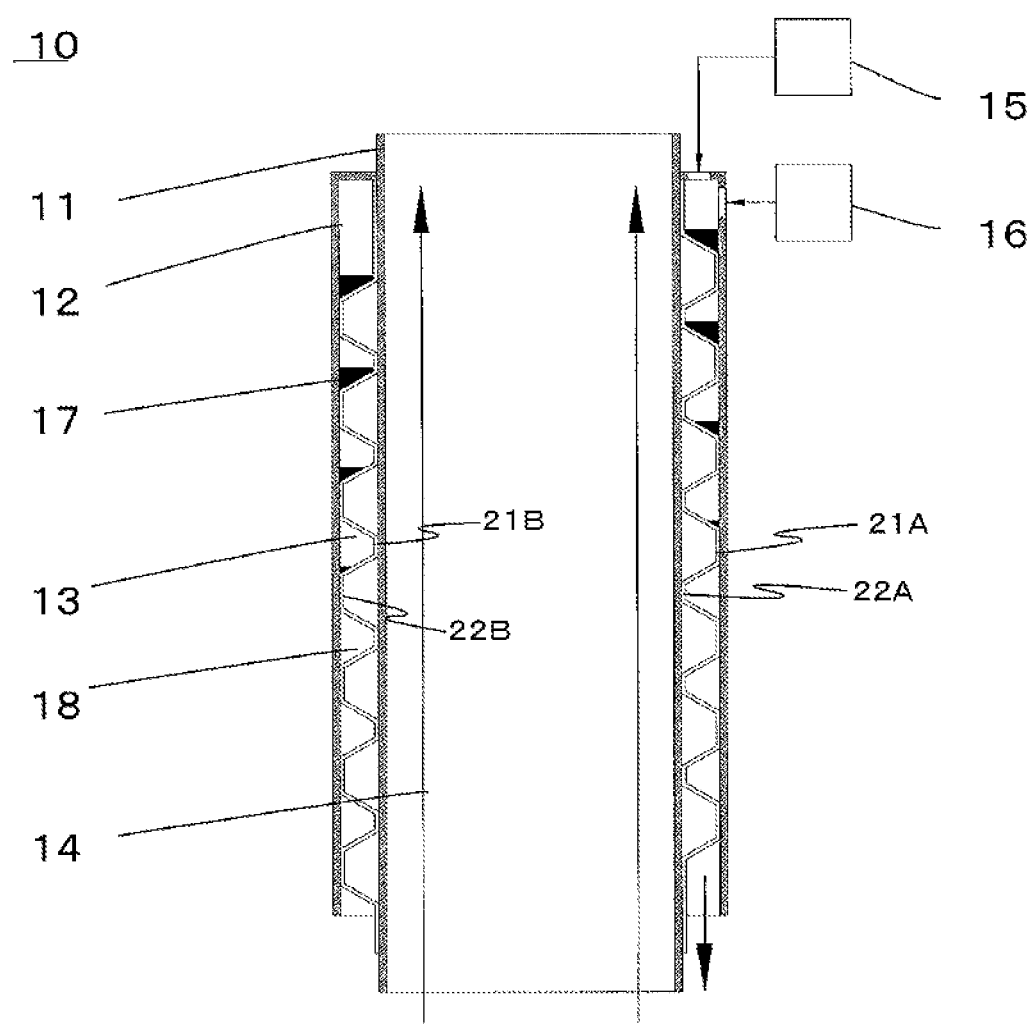
FIG. 5 is a schematic diagram of a cross-section of an evaporator in Embodiment 2.

The area of the top surface of the protrusion on the outer circumference surface of the center cylinder that comes in contact with the inner circumference surface of the outer cylinder (hereafter also referred to as "contact area of the outer cylinder and the center cylinder") may or may not be same as the area of the top surface of the protrusion on the inner circumference surface of the center cylinder that comes in contact with the outer circumference surface of the inner cylinder (hereafter also referred to as "contact area of the inner cylinder and the center cylinder") (see Embodiment 2, FIG. 5). By adjusting the contact area of the inner cylinder or the outer cylinder and the center cylinder, it is possible to improve sealing performance of the evaporation channel (see Embodiment 2) and adjust the amount of heat conducting to the center cylinder. For example, by increasing the contact area of the inner cylinder and the center cylinder, it is possible to increase the amount of heat conducting to the center cylinder from the combustion gas via the inner cylinder; and by diminishing the contact area of the inner cylinder and the center cylinder, it is possible to decrease the amount of heat conducting to the center cylinder from the combustion gas via the inner cylinder. Further, by increasing the contact area of the outer cylinder and the center cylinder, it is possible to increase the amount of heat escaping from the center cylinder to the outer cylinder; and by diminishing the contact area of the outer cylinder and the center cylinder, it is possible to decrease the amount of heat escaping from the center cylinder to the outer cylinder.

The spiral recess of the center cylinder does not come in contact with inner cylinder and outer cylinder. Therefore, the evaporator has a spiral space formed of a recess on the inner circumference surface of the center cylinder between the outer circumference surface of the inner cylinder and the inner circumference surface of the center cylinder; and a spiral space formed of a recess on the outer circumference surface of the center cylinder between the inner circumference surface of the outer cylinder and the outer circumference surface of the center cylinder. The spiral space between the center cylinder and the inner cylinder or the outer cylinder serves as the evaporation channel.

In the present invention, depending on the operating state of the hydrogen generating apparatus, the spiral space between the center cylinder and the outer cylinder or the spiral space between the center cylinder and inner cylinder may serve as the evaporation channel. Both the spiral space between the center cylinder and the inner cylinder and the spiral space between the center cylinder and the outer cylinder may serve as the evaporation channel. The length of the evaporation channel may be, for example, approximately 4,000 mm.

Where the spiral space between the center cylinder and the outer cylinder is used as the evaporation channel, the water to be reformed does not directly come in contact with the inner cylinder that contains the combustor. Therefore, it is possible to mildly heat the water to be reformed and prevent the water to be reformed from bumping. On the other hand, where the spiral space between the center cylinder and the inner cylinder is used as the evaporation channel, since the water to be reformed directly comes in contact with the inner cylinder that includes therein the combustor, it is possible to effectively heat the water to be reformed.

Further, the pitch of the spiral evaporation channel may be constant or vary. For example, by setting the pitch of the evaporation channel in the upstream side to be smaller than the pitch of the evaporation channel in the downstream side, it is possible to maintain the temperature of the shift converter and the CO remover within an optimal range (see Embodiment 3, FIG. 6). To change the pitch of the evaporation channel, the pitch of the spiral recess that constitutes the evaporation channel may be changed.

Further, there may be a single or multiplicity of evaporation channels. However, it is preferable to provide a multiplicity of evaporation channels. This is because when there is a multiplicity of evaporation channels, it is possible to make uniform the evaporation channel's temperature distribution in the circumferential direction of the cylinders.

As with the inner cylinder and outer cylinder, the center cylinder may be fabricated by vertically welding a rolled metal plate. The material of the metal plate constituting the center cylinder is, for example, austenitic stainless steel, such as SUS310. The material of the metal plate constituting the center cylinder may be preferably same as the material of the metal plate constituting the inner cylinder and the outer cylinder. This is in order to allow the inner cylinder, the outer cylinder and the center cylinder to exhibit the same thermal expansion coefficient. Where the inner cylinder, the outer cylinder and the center cylinder have different thermal expansion coefficients, a gap is generated between the center cylinder and inner cylinder and between the center cylinder and the outer cylinder during the operation of the hydrogen generating apparatus, resulting in reduced sealing performance of the evaporation channel.

On the other hand, it is preferable that the plate constituting the center cylinder is thinner than the plates constituting the inner cylinder and the outer cylinder. Specifically, it is preferable that the thickness of the plate constituting the center cylinder is 0.2 to 0.6 mm, and more preferably 0.2 to 0.4 mm. Where the thickness of the plate constituting the center cylinder is within the range of 0.2 to 0.6 mm, a desired pattern of recesses and protrusions can be easily formed on the inner circumference surface and outer circumference surface of the center cylinder by bulge forming (hydro forming).

In this way, the corners of the protrusions and recesses formed by bulge forming are round, and normally they have a curvature radius of 1 to 3 mm.

By forming the spiral recess and the protrusion on the inner circumference surface and outer circumference surface of the center cylinder formed of the thin plate as above in such a unitary manner that one of the spiral protrusion and the spiral recess serves as the other on one of inner circumference surface and outer circumference surface of the center cylinder and vice versa, it is possible to impart elasticity and extensibility in the axial direction and radial direction of the center cylinder. In this way, in the present invention, the center cylinder has elasticity and extensibility.

Although the method for fabricating the evaporator is not specifically limited, the center cylinder in which the spiral protrusion and the spiral recess are formed in the unitary manner on both sides of the surfaces thereof may be inserted between the prepared inner cylinder and the outer cylinder. As stated above, since the center cylinder has elasticity and extensibility in the radial direction, the wave shape of the center cylinder is deformed to fit the contour of the space between the inner cylinder and the outer cylinder, so that the center cylinder makes an intimate contact with the outer cylinder and inner cylinder.

On the other hand, where the center cylinder fais to make an intimate contact with the outer cylinder and inner cylinder upon insertion of the center cylinder between the inner cylinder and outer cylinder, the protrusion of the center cylinder may be raised higher (FIG. 4 reference) by compressing the center cylinder in the axial direction, the inner cylinder may be tube-expanded, or the outer cylinder may be contracted after the center cylinder is inserted between the inner cylinder and the outer cylinder.

In this way, in the present invention, the center cylinder is deformed to come into intimate contact with the inner cylinder and outer cylinder by utilizing the elasticity and extensibility that the center cylinder has. Therefore, even when beads caused by vertical welding are placed on the outer circumference surface of the inner cylinder or on the inner circumference surface of the outer cylinder, or even when the circularity of the inner cylinder or the outer cylinder is insufficient, the center cylinder can come into intimate contact with the inner cylinder and the outer cylinder with a strong force. Therefore, in the present invention, it is possible to seal the evaporation channel with a strong force without having to weld the center cylinder with the inner cylinder and the outer cylinder. This makes it possible to prevent the water to be reformed from bypassing sections of the evaporation channel.

Further, as stated above, since the center cylinder makes an intimate surface contact with the inner cylinder and the outer cylinder, the contact area between the center and inner cylinder and the contact area between the center cylinder and outer cylinder are stabilized, and thereby the amount of heat conducting to the center cylinder from the combustion gas via the inner cylinder is stabilized. This stabilizes the temperature of the evaporation channel defined by the center cylinder and makes it possible to prevent sudden temperature change in the evaporation channel.

The evaporator in the hydrogen generating apparatus of the present invention thus can heat the water to be reformed at a constant rate and evaporate it at a constant rate. Therefore, it is possible to stabilize the flow rate and the temperature of the water vapor to be formed, without having to increase the size of the evaporator. As a result, the hydrogen generating apparatus of the present invention can stably supply hydrogen.

Hereafter, embodiments of the present invention will be described with reference to the accompanying drawings. The present invention is not limited to the following embodiments.

Embodiment 1

FIG. 1 is a schematic diagram of a cross-section of hydrogen generating apparatus 1 according to Embodiment 1. As illustrated in FIG. 1, hydrogen generating apparatus 1 includes evaporator 10, reformer 2, shift converter 3, CO remover 4 connected to hydrogen exhaust port 5, and combustor 6.

Evaporator 10 includes inner cylinder 11, outer cylinder 12 surrounding inner cylinder 11, and center cylinder 13 inserted between inner cylinder 11 and outer cylinder 12. The length in the gravity direction of evaporator 10 is 300 to 400 mm.

Reformer 2 is disposed in a part in the lower side in the gravity direction of evaporator 10 and surrounds inner cylinder 11 extending from evaporator 10. Shift converter 3 surrounds the region of lower part in the gravity direction (downstream side of evaporation channel 18) of evaporator 10. CO remover 4 surrounds the region in the upper part in the gravity direction (upstream side of evaporation channel 18) of evaporator 10.

Combustor 6 is disposed in heat chamber 9 disposed inside inner cylinder 11 of evaporator 10. The combustor is connected to fuel air feeder 7 for supplying fuel and air for combustion to combustor 6. Combustor 6 is, for example, a burner. The air heated by combustor 6 is drained from combustion gas exhaust port 8 through combustion gas passage 14.

Next, the structure of evaporator 10 will be described in detail. As stated above, evaporator 10 includes inner cylinder 11, outer cylinder 12 surrounding inner cylinder 11, and center cylinder 13 inserted between inner cylinder 11 and outer cylinder 12.

Figure 2:
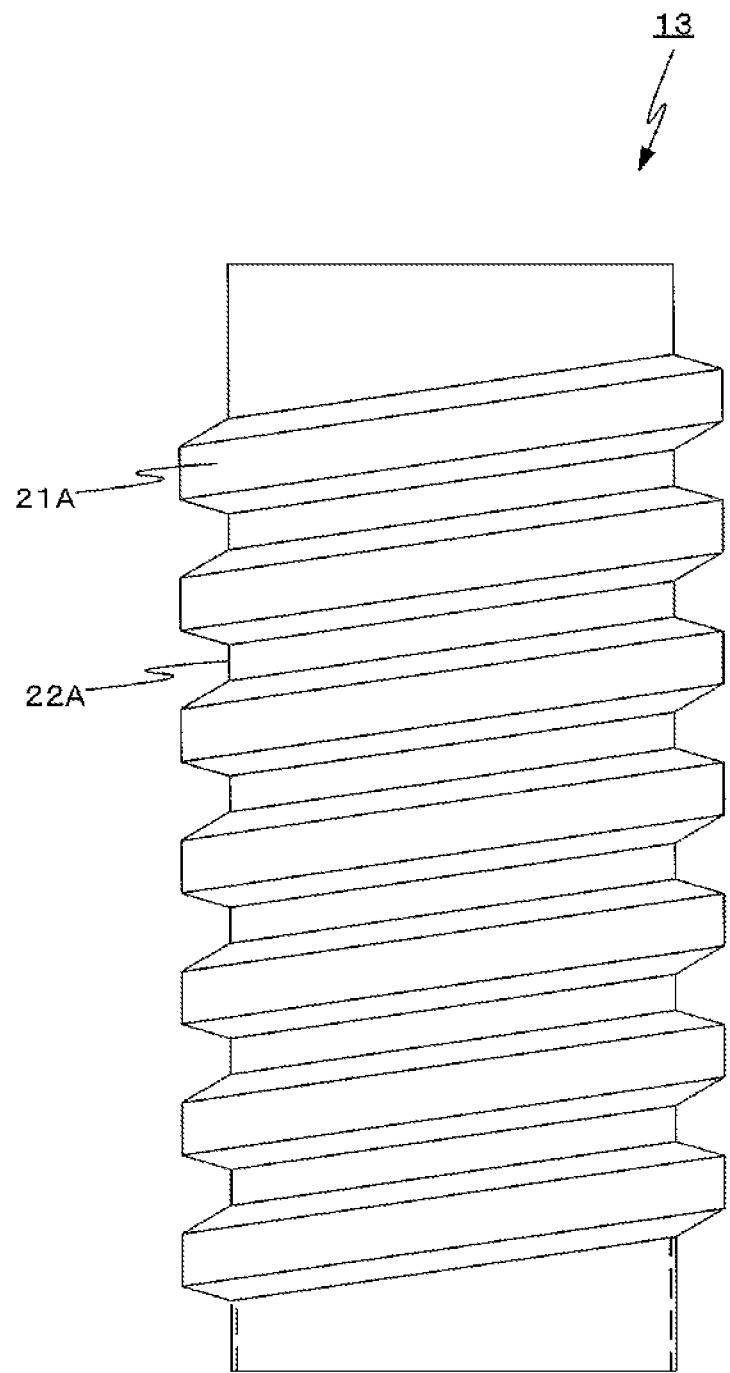
FIG. 2 is a side-view of a center cylinder according to Embodiment 1.

FIG. 2 is a side-view of center cylinder 13. As illustrated in FIG. 1 and FIG. 2, on the inner circumference surface and the outer circumference surface of center cylinder 13, spiral protrusion 21 and spiral recess 22 are formed in such a unitary manner that one of the spiral protrusion and the spiral recess serves as the other on one of inner circumference surface and outer circumference surface of the center cylinder, and vice versa. Protrusion 21A on the outer circumference surface of center cylinder 13 corresponds to the recess 223 on the inner circumference surface of center cylinder 13, and recess 22A on the outer circumference surface of center cylinder 13 corresponds to protrusion 21B on inner circumference surface of center cylinder 13. As illustrated in FIG. 2 and FIG. 1, protrusion 21 has forward-tapered shape.

Width W1 of protrusion 21A on the outer circumference surface of center cylinder 13 being in contact with the inner circumference surface of outer cylinder 12 is 1-30 mm, width W2 of protrusion 21B on the inner circumference surface of center cylinder 13 being in contact with the outer circumference surface of inner cylinder 11 is 2-50 mm.

In the present embodiment, recess 22A on the outer circumference surface of center cylinder 13 constitutes evaporation channel 18. Therefore, in the present embodiment, water to be reformed 17 flows between outer cylinder 12 and center cylinder 13.

Next, a method for manufacturing such center cylinder 13 by bulge forming will be described with reference to FIG. 3A to FIG. 3D.

As illustrated in FIG. 3A to FIG. 3D, the method for manufacturing center cylinder 13 by bulge forming includes: 1) a first step of providing cylinder 30 formed of a thin plate (FIG. 3A); 2) a second step of loading cylinder 30 into mold 31 and hermetically sealing both ends of cylinder 30 by pistons 33 (FIG. 3B); 3) a third step of injecting liquid 35 into cylinder (FIG. 3C); and 4) a fourth step of forming recesses and protrusions on cylinder 30 by raising pressure of liquid 35 in cylinder 30 (FIG. 3D).

Next, a method for manufacturing evaporator 10 of the present embodiment will be described with reference to FIG. 4A to FIG. 4D.

As illustrated in FIG. 4A to FIG. 4D, the method for manufacturing evaporator 10 includes: 1) a first step of providing inner cylinder 11 and outer cylinder 12 (FIG. 4A); 2) a second step of inserting center cylinder 13 between inner cylinder 11 and outer cylinder 12 (FIG. 4B); 3) a third step of compressing, in the axial direction, center cylinder 13 inserted between inner cylinder 11 and outer cylinder 12 (FIG. 4C); and 4) a fourth step of securing center cylinder 13 in the state where it is compressed in the axial direction (FIG. 4D).

It is preferable to set height h of protrusion in center cylinder 13 (or depth of recess) to be smaller than interval d between inner cylinder 11 and outer cylinder 12 so that center cylinder 13 is easily inserted into the space between inner cylinder 11 and outer cylinder 12 in the second step.

In the third step, center cylinder 13 is compressed in the axial direction. As stated above, since center cylinder 13 is extensible in the radial direction, height h of protrusion in center cylinder 13 (or depth of recess) increases by compressing center cylinder 13 in the axial direction. Further, since center cylinder 13 has elasticity, the wave shape of center cylinder 13 deforms to fit the countor of the space between inner cylinder 11 and outer cylinder 12, and thereby center cylinder 13 makes an intimate contact with inner cylinder 11 and outer cylinder 12.

In this way, in the present embodiment, since elasticity and extensibility of the center cylinder are used to cause the deformation of the center cylinder so that it comes into intimate contact with the inner cylinder and outer cylinder, the center cylinder can firmly come into intimate contact with the inner cylinder and outer cylinder. Therefore, in the present embodiment, it is possible to seal the evaporation channel with a strong force. This makes it possible to prevent the water to be reformed from bypassing sections of the evaporation channel.

Further, since the center cylinder makes an intimate surface contact with the inner cylinder and outer cylinder, the contact area between the center cylinder and inner cylinder and the contact area between the center cylinder and outer cylinder are stabilized, and thereby the amount of heat conducting to the center cylinder from the combustion gas via the inner cylinder is stabilized. This stabilizes the temperature in the evaporation channel defined by the center cylinder, making it possible to prevent sudden temperature change in the evaporation channel.

With reference to FIG. 1, the following describes a procedure for generating fuel gas by using hydrogen generating apparatus 1 of the present embodiment.

Combustor 6 is driven and hydrogen generating apparatus 1 is heated entirely. After confirming that each member of hydrogen generating apparatus 1 has reached a temperature suitable for reaction, source gas is supplied from source feeder 15 to evaporation channel 18 of evaporator 10, and water to be reformed 17 is supplied thereto from water feeder 16.

In evaporation channel 18 of evaporator 10, temperature rises gradually from the upstream to downstream by heat transfer from the combustion gas in combustion gas passage 14. The temperature in evaporation channel 18 is adjusted in consideration of the configurations of the hydrogen generating apparatus and fuel cell system as well as the difference in activity temperature between reforming catalyst and selective oxidation catalyst (later described). Specifically, the temperature in upstream side of evaporation channel 18 is room temperature to approximately 100° C., and the temperature in the downstream side of evaporation channel 18 is 100° C. to 300° C.

Therefore, water to be reformed 17 does not vaporize in the upstream side of evaporation channel 18, is gradually heated in the process of flowing through evaporation channel 18 and evaporated in the downstream side. As a result, the mixture gas of the water vapor and the source gas is produced within evaporator 10. The mixture gas is further heated in the process of flowing through evaporation channel 18.

The mixture gas produced in evaporator 10 enters reformer 2. In reformer 2, due to catalytic action of reforming catalyst of reformer 2, the source gas mixed with and water vapor undergoes a steam reforming reaction to form hydrogen-containing gas.

The dydrogen-containing gas formed in reformer 2 enters shift converter 3. In shift converter 3, carbon monoxide in the hydrogen-containing gas is shift-converted by the CO shift convertion reaction due to the catalytic action of reforming catalyst.

As the reforming catalytic substance exhibits a high catalytic action at approximately 1.50° C. to 400° C., it is requested to maintain the temperature of shift converter 3 at a relatively high temperature (150° C. to 400° C.) when hydrogen generating apparatus 1 is in operation. The temperature of shift converter 3 is maintained by exchanging heat with the region of the lower part in the gravity direction of evaporator 10.

The hydrogen-containing gas from which carbon monoxide is removed in the shift converter enters CO remover 4. In the CO remover, carbon monoxide in the hydrogen-containing gas reacts with oxygen by the catalytic action of CO selective oxidation catalyst, whereby carbon monoxide in the hydrogen-containing gas is oxidized and the carbon monoxide in the hydrogen-containing gas is removed.

Since the CO selective oxidation catalyst exhibits a high catalytic action at approximately 80° C. to 200° C., it is requested that the temperature of CO remover 4 is maintained at a relatively low temperature (80° C. to 200° C.) while hydrogen generating apparatus 1 is in operation. The temperature of CO remover 4 is maintained by exchanging heat with the region of the upper part in the gravity direction of evaporator 10.

The hydrogen-containing gas (fuel gas) from which carbon monoxide has been removed in the CO remover flows out of hydrogen exhaust port 5 and supplied to a fuel cell. Further, a part of the hydrogen-containing gas that remained unconsumed in the fuel cell is supplied as off-gas to the combustor and used as a fuel for the combustor.

As stated above, evaporator 10 in hydrogen generating apparatus 1 of the present embodiment can heat water to be reformed 17 at a constant rate and evaporate it at a constant rate. Therefore, it is possible to stabilize the flow rate and the temperature of the water vapor to be generated without having to increase the size of evaporator 10. As a result, hydrogen generating apparatus 1 can supply hydrogen in a stable manner.

Embodiment 2

Embodiment 1 is directed to an embodiment in which the contact area between the outer cylinder and center cylinder is equal to the contact area between the inner cylinder and center cylinder. Embodiment 2 is directed to an embodiment in which the contact area between the outer cylinder and center cylinder is larger than the contact area between the inner cylinder and center cylinder.

FIG. 5 is a schematic diagram of a cross-section of evaporator 10 of Embodiment 2. Explanations are omitted for the same components as those of evaporator 10 in Embodiment 1. Similarly to Embodiment 1, also in Embodiment 2, recess 22A on the outer circumference surface of center cylinder 13 constitutes evaporation channel 18.

As illustrated in FIG. 5, in evaporator 10 of Embodiment 2, the area of the top surface of protrusion 21A on the outer circumference surface of center cylinder 13 is larger than the area of protrusion 21B on the inner circumference surface of center cylinder 13. In this way, by broadening the top surface of protrusion 21A on the outer circumference surface of center cylinder 13, sealing of evaporation channel 18 comprising recess 22A on the outer circumference surface of center cylinder 13 improves, and it is thus possible to more reliably prevent bypassing of water to be reformed 17.

Embodiment 3

Embodiments 1 and 2 are directed to embodiments in which the pitch of the evaporation channel is constant. Embodiment 3 is directed to an embodiment in which the channel pitch is different between the upstream side and the downstream side of the evaporation channel.

Figure 6:
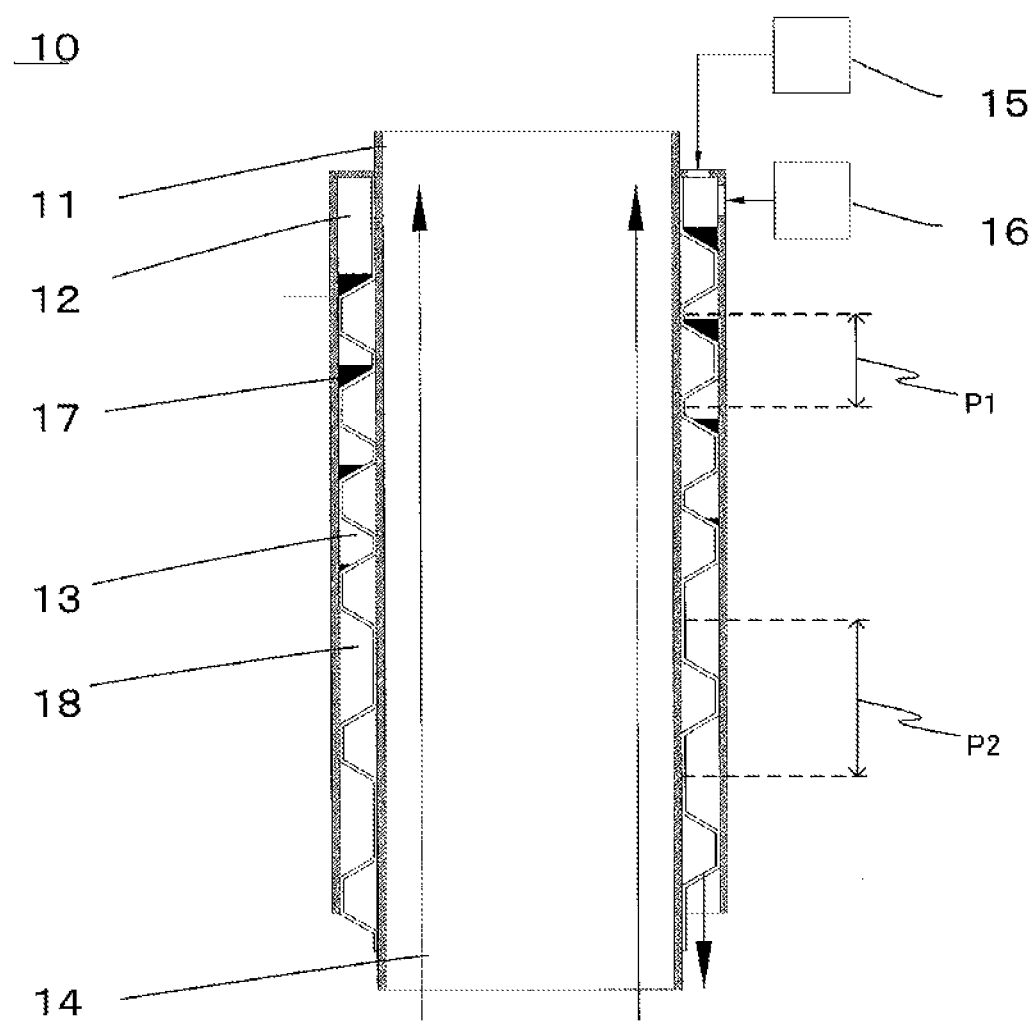
FIG. 6 is a schematic diagram of a cross-section of an evaporator in Embodiment 3.

FIG. 6 is a schematic diagram of a cross-section of evaporator 10 of Embodiment 3. Explanations are omitted for the same components as those of evaporator 10 of Embodiment 1.

As illustrated in FIG. 6, in evaporator 10 of Embodiment 3, the pitch of evaporation channel 18 is different between the upstream side and the downstream side. More specifically, pitch P1 of evaporation channel 18 in the upstream side is smaller than pitch P2 of evaporation channel 18 in the downstream side. The maximum pitch of pitch P2 of evaporation channel 18 in the downstream side is preferably at least twice as large as the minimum pitch of pitch P1 of evaporation channel 18 in the upstream side, and may be at least 4 times as large as the minimum pitch of P1. For example, channel pitch P1 of the upper part in the gravity direction may be 12 mm in average, and channel pitch P2 of the lower part in the gravity direction may be 48 mm in average.

In this way, by setting pitch P1 of evaporation channel 18 in the upstream side to be smaller than pitch P2 of evaporation channel 18 in the downstream side, the length of evaporation channel 18, residing in the region in the upper part in the gravity direction of evaporator 10, per unit height of evaporator 10 becomes larger, and the length of evaporation channel 18, residing in the region in the lower part in the gravity direction of evaporator 10, per unit height of evaporator 10 becomes small.

Therefore, in the present embodiment, substantially all of water to be reformed 17 is heated to the evaporation temperature in the process of flowing through long evaporation channel 18 residing in the region in the upper part in the gravity direction of evaporator 10, and is evaporated. Due to this, substantially no water to be reformed 17 flows into evaporation channel 18 residing in the lower part in the gravity direction of evaporator 10. In other words, in the present embodiment, water to be reformed 17 is distributed unevenly to the upper part in the gravity direction of evaporator 10. More specifically, in the region surrounded by CO remover 4, the channel pitch is set short, and in the region enveloped by shift converter 3, the channel pitch is set long.

In this way, by distributing water to be reformed 17 unevenly to upper part in the gravity direction of evaporator 10, it becomes possible to maintain CO remover 4 and shift converter 3 at an optimum temperature. Hereafter, a mechanism to maintain CO remover 4 and shift converter 3 at optimum temperature will be described.

As stated in the explanation of Embodiment 1, the optimum temperature of CO remover 4 is comparatively low temperature (80° C. to 200° C.). Further, CO remover 4 surrounds the region in the upper part in the gravity direction of evaporator 10 (see FIG. 1). In the present embodiment, water to be reformed 17 localizes in the region in the upper part in the gravity direction of evaporator 10, and therefore, water to be reformed 17 absorbs heat from inner cylinder 11 in a region in the upper part in the gravity direction of evaporator 10. This decreases the amount of heat conducting from inner cylinder 11 to CO remover 4 that surrounds the region in the upper part in the gravity direction of evaporator 10, thereby making it possible to maintain CO remover 4 at a relatively low temperature.

On the other hand, the optimal temperature of shift converter 3 is relatively high (150° C. to 400° C.). Further, shift converter 3 surrounds the region in the lower part in the gravity direction of evaporator 10 (see FIG. 1). As stated above, in the present embodiment, mainly water vapor and source gas flow through evaporation channel 18 residing in lower part in the gravity direction of evaporator 10, and water to be reformed 17 which has high heat absorption power does not exist therein. Therefore, the amount of heat conducting from inner cylinder 11 to shift converter 3 that surrounds the region in the lower part in the gravity direction of evaporator 10 does not decrease. Further, since evaporation channel 18 residing in the lower part in the gravity direction of evaporator 10 is short, the period of time in which the water vapor and source gas flowing through evaporation channel 18 absorb heat from shift converter 3 is short. As a result, it is possible to prevent temperature drop of shift converter 3 and thus to maintain shift converter 3 at a relatively high temperature.

Embodiment 4

Embodiment 4 is directed to an embodiment in which a recess of the center cylinder that constitutes the evaporation channel has a deep region and a shallow region.

Figure 7:
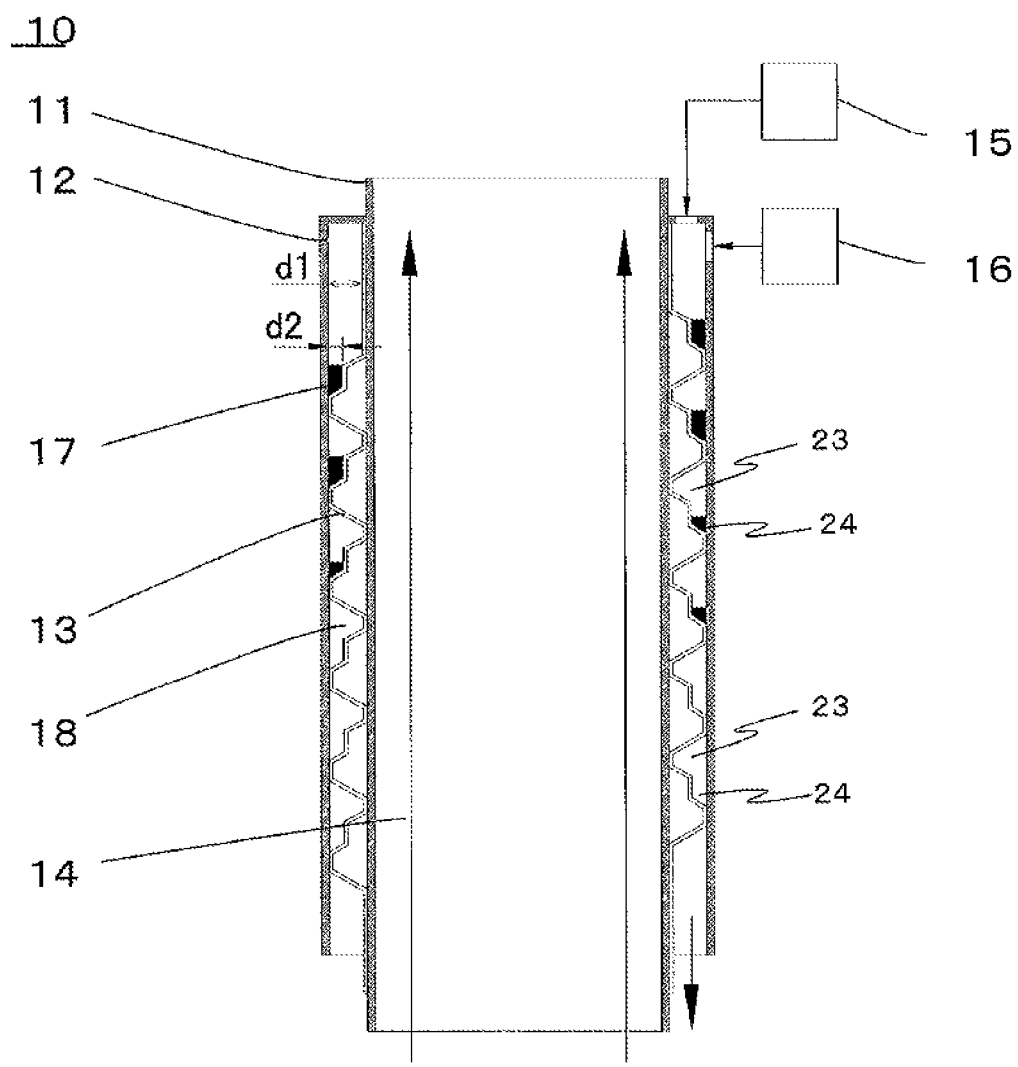
FIG. 7 is a schematic diagram of a cross-section of an evaporator in Embodiment 4.

FIG. 7 is a schematic diagram of a cross-section of evaporator 10 of Embodiment 4. Explanations are omitted for the same components as those of evaporator 10 of Embodiment 1.

As illustrated in FIG. 7, in evaporator 10 of Embodiment 4, a recess on the outer circumference surface of center cylinder 13 that constitutes evaporation channel 18 has region 23 in the part in the upper side in the gravity direction, and region 24 in the part in the lower side in the gravity direction, in which depths of regions 23 and 24 are different from each other. Depth d1 of region 23 is larger than depth d2 of region 24.

In evaporator 10 as above of Embodiment 4, water to be reformed 17 flows between region 24 and the inner circumference surface of outer cylinder 12. Therefore, in the present embodiment, water to be reformed 17 is apart from inner cylinder 11. This makes it possible to prevent heat from suddenly being transferred to water to be reformed 17 from combustor 6 via inner cylinder 11 and to prevent water to be reformed 17 from bumping.

Embodiment 5

In Embodiments 1-4, embodiments in which evaporation channel comprises a recess on the outer circumference surface of the center cylinder are explained. In Embodiment 5, an embodiment in which the evaporation channel comprising a recess on the inner circumference surface of center cylinder is described. Further, in Embodiment 5, similarly to Embodiment 4, the recess of the center cylinder constituting the evaporation channel has a deep region and a shallow region.

Figure 8:
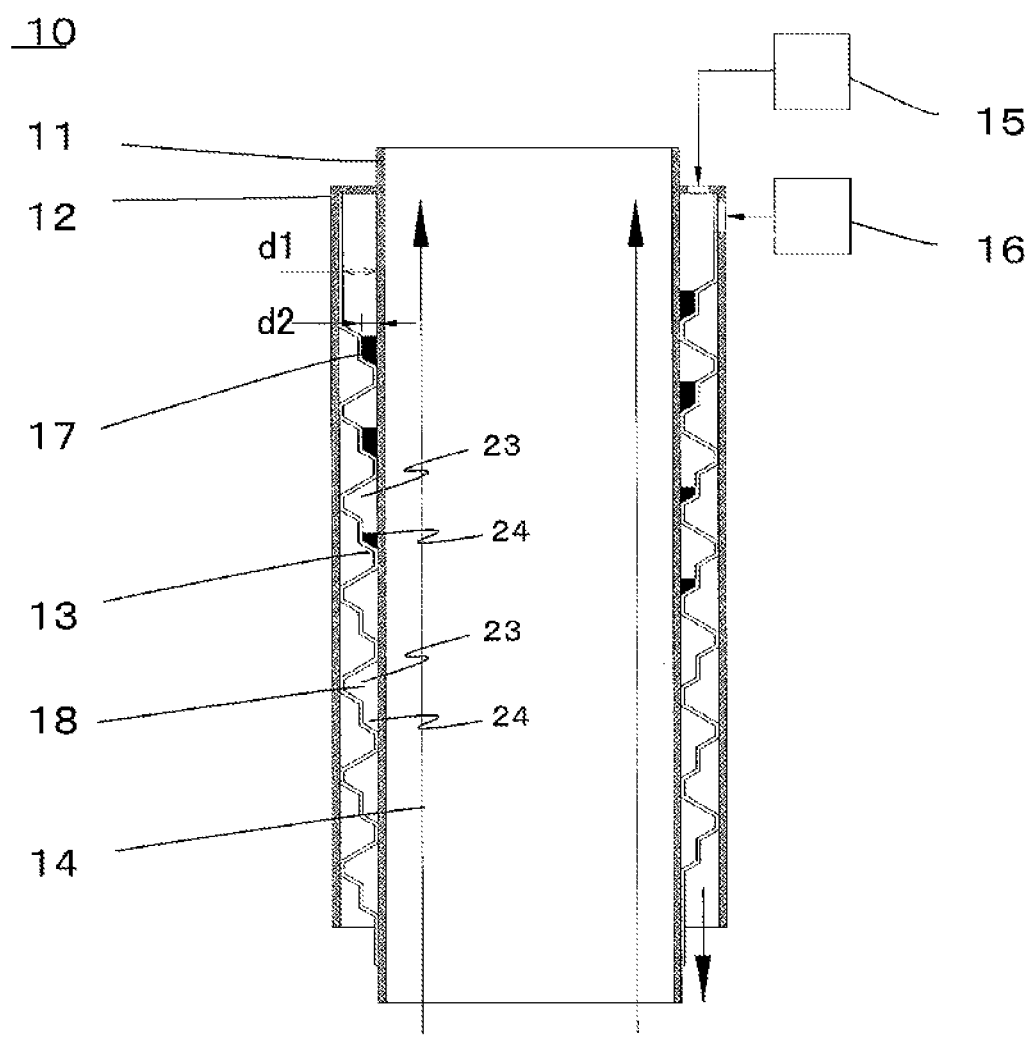
FIG. 8 is a schematic diagram of a cross-section of an evaporator in Embodiment 5.

FIG. 8 is a schematic diagram of a cross-section of evaporator 10 of Embodiment 5. Explanations are omitted for the same components as those of evaporator 10 of Embodiment 1.

As illustrated in FIG. 8, in the present embodiment, the recess on the inner circumference surface of center cylinder 13 constitutes evaporation channel 18. Further, the recess on the inner circumference surface of center cylinder 13 that constitutes evaporation channel 18 has region 23 in the part in the upper side in the gravity direction and region 24 in the part in the lower side in the gravity direction, in which depths of regions 23 and 24 are different from each other. Depth d1 of region 23 is larger than depth d2 of region 24.

In evaporator 10 of Embodiment 5, water to be reformed 17 flows between region 24 and outer circumference surface of inner cylinder 11. Therefore, in the present embodiment, the area in which water to be reformed 17 comes in contact with outer circumference surface of inner cylinder 11 is large, so that the amount of heat that water to be reformed 17 receives from combustor 6 via inner cylinder 11 can be increased. This makes it possible to shorten evaporation channel 18, and downsize evaporator 10.

Embodiment 6

Embodiment 6 is directed to an embodiment in which the evaporation channel has a projection that serves as a barrier that controls the flow of the water to be reformed.

Figure 9:
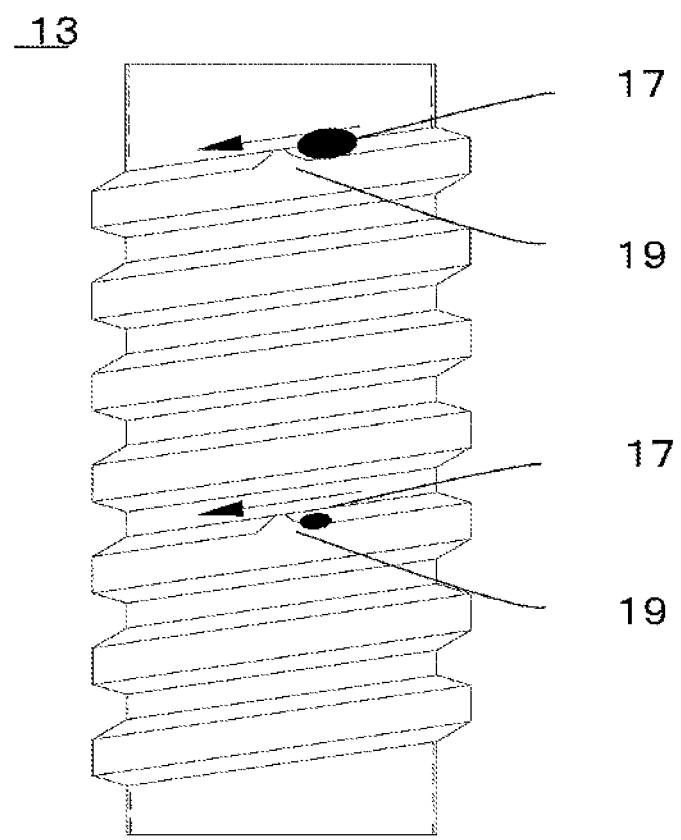
FIG. 9 is a side-view of a center cylinder in Embodiment 6.
Figure 10:
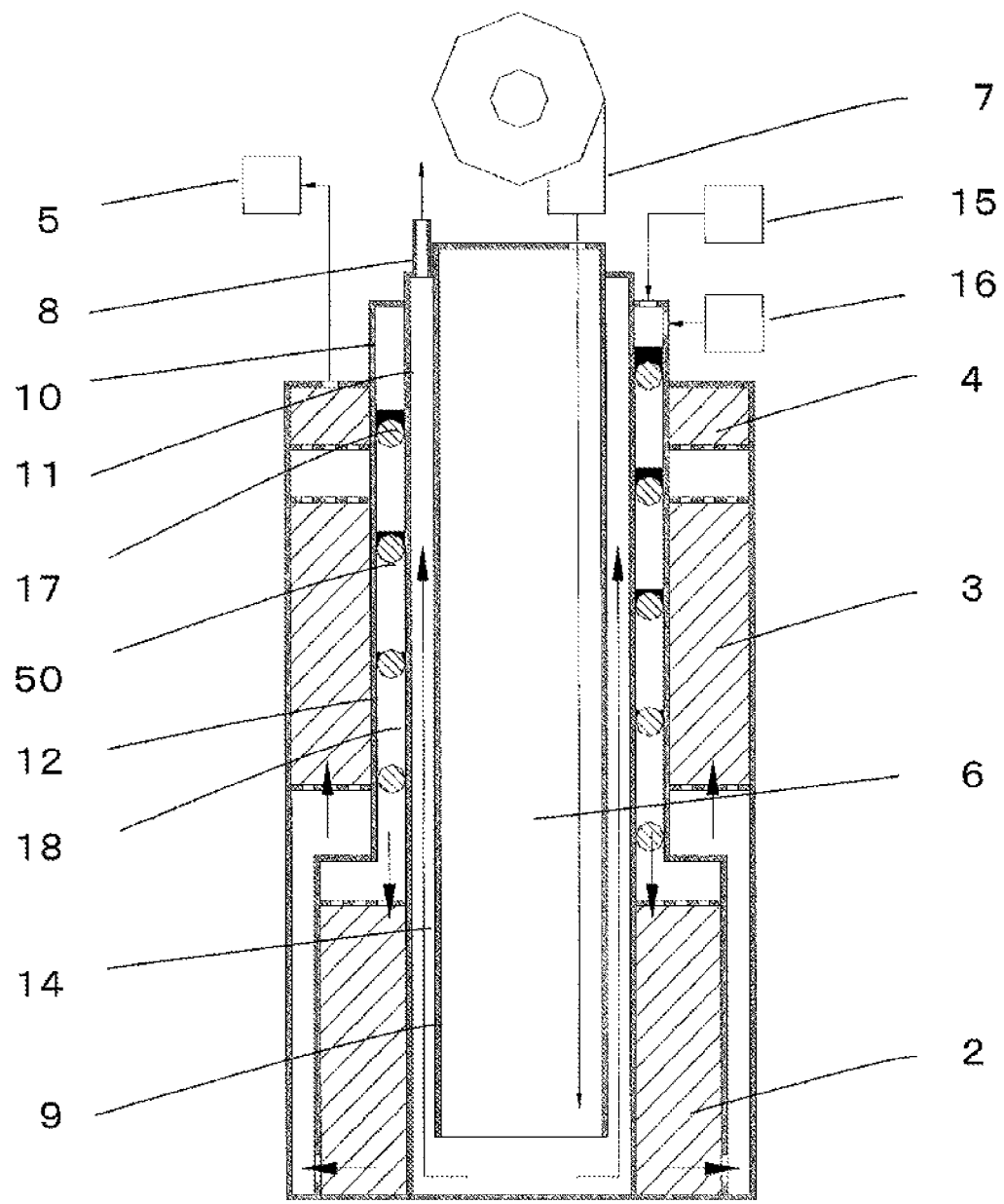
FIG. 10 is a schematic diagram of a cross-section of a conventional hydrogen generating apparatus.

FIG. 9 is a side-view of center cylinder 13 of evaporator in Embodiment 6. Explanations are omitted for the same components as those of center cylinder 13 of Embodiment 1.

As illustrated in FIG. 9, in the present embodiment, the recess on the outer circumference surface of center cylinder 13 that constitutes evaporation channel 18 has projection 19 that serves as a barrier that controls the flow of the water to be reformed.

In this way, by having projection 19 that serves as the resistor against the flow of the water to be reformed in evaporation channel 18, it is possible to reduce the flow rate of the water to be reformed where the flow of water to be reformed is too fast, so that water to be reformed 17 can be evaporated in a stable manner.

INDUSTRIAL APPLICABILITY

Since the hydrogen generating apparatus according to the present invention can supply hydrogen-containing gas stably, it is useful for fuel cell systems such as residential cogeneration systems.

REFERENCE SIGNS LIST 1 hydrogen generating apparatus
2 reformer
3 shift converter
4 CO remover
5 hydrogen exhaust port
6 combustor
7 fuel air feeder
8 combustion gas exhaust port
9 heat chamber
10 evaporator
11 inner cylinder
12 outer cylinder
13 center cylinder
14 combustion gas passage
15 source feeder
16 water feeder
17 water to be reformed
18 evaporation channel
19 projection
21 protrusion
22 recess
23 deep region
24 shallow region
30 cylinder
31 mold
33 piston
35 liquid
50 round rod

The invention claimed is:

1. A hydrogen generating apparatus comprising:
an evaporator configured to generate a mixture gas by mixing a source gas containing methane with water vapor;
a reformer configured to convert the mixture gas to hydrogen-containing gas by a steam reforming reaction; and
a combustor configured to supply heat to the evaporator and the reformer, wherein
the evaporator comprises an inner cylinder, an outer cylinder surrounding the inner cylinder, and a center cylinder inserted between the inner cylinder and the outer cylinder, the center cylinder defining, between the inner cylinder and the outer cylinder, a spiral channel configured to allow water supplied from outside to flow,
a spiral protrusion and a spiral recess, the spiral protrusion and the spiral recess formed on an inner circumference surface and an outer circumference surface of the center cylinder in such a unitary manner that one of the spiral protrusion and the spiral recess serves as the other on one of inner circumference surface and outer circumference surface of the center cylinder and vice versa,
a top surface of the protrusion on the inner circumference surface of the center cylinder comes in contact with an outer circumference surface of the inner cylinder, and a top surface of the protrusion on the outer circumference surface of the center cylinder comes in contact with an inner circumference surface of the outer cylinder,
width W1 of protrusion on the outer circumference surface of center cylinder being in contact with the inner circumference surface of outer cylinder is 1-30 mm,
width W2 of protrusion on the inner circumference surface of center cylinder being in contact with the outer circumference surface of inner cylinder is 2-50 mm, and
pitch P1 of evaporation channel in the upstream side is smaller than pitch P2 of evaporation channel in the downstream side.

2. The hydrogen generating apparatus according to claim 1, wherein a thickness of a plate constituting the center cylinder is 0.2 to 0.6 mm.

3. The hydrogen generating apparatus according to claim 1, wherein the center cylinder is not welded to the inner cylinder and the outer cylinder.

4. The hydrogen generating apparatus according to claim 1, wherein an area of the top surface of the protrusion on the inner circumference surface of the center cylinder that comes in contact with the outer circumference surface of the inner cylinder is different from an area of the top surface of the protrusion on the outer circumference surface of the center cylinder that comes in contact with the inner circumference surface of the outer cylinder.

5. The hydrogen generating apparatus according to claim 1, wherein a pitch of the spiral channel in the upstream side, and a pitch of the spiral channel in the downstream side are different from each other.

6. The hydrogen generating apparatus according to claim 1, wherein the spiral channel configured to allow the water to flow is formed of the recess on the outer circumference surface of the center cylinder.

7. The hydrogen generating apparatus according to claim 6, wherein the recess on the outer circumference surface of the center cylinder has a region in an upper side in a direction of the gravitational force, and a region in a lower side in a direction of the gravitational force,
the region in the lower side in the direction of the gravitational force is shallower than the region in the upper side in the direction of the gravitational force, and the water flows between the region in the lower side in the direction of the gravitational force and the inner circumference surface of the outer cylinder.

8. The hydrogen generating apparatus according to claim 1, wherein the spiral channel configured to allow the water to flow is formed of the recess on the inner circumference surface of the center cylinder.

9. The hydrogen generating apparatus according to claim 8, wherein the recess on the inner circumference surface of the center cylinder has a region in an upper side in a direction of the gravitational force, and a region in a lower side in a direction of the gravitational force,
the region in the lower side in the direction of the gravitational force is shallower than the region in the upper side in the direction of the gravitational force, and the water flows between the region in the lower side in the direction of the gravitational force and the outer circumference surface of the inner cylinder.

10. The hydrogen generating apparatus according to claim 1, wherein the spiral channel configured to allow the water to flow comprises a projection that serves as a barrier for controlling the flow of the water.

11. The hydrogen generating apparatus according to claim 1, wherein the center cylinder is composed of material having elasticity and extensibility properties.

* * * * *